United States Patent [19]

Anderson

[11] 4,225,562
[45] Sep. 30, 1980

[54] MULTI-BED CATALYTIC REACTOR

[75] Inventor: Mark C. Anderson, Corpus Christi, Tex.

[73] Assignee: UOP Inc., Des Plaines, Ill.

[21] Appl. No.: 38,990

[22] Filed: May 14, 1979

[51] Int. Cl.³ .................... B01J 8/02; B01D 53/04; C10G 51/06
[52] U.S. Cl. .................................... 422/188; 55/387; 55/484; 208/146; 422/190; 422/191; 422/193; 422/194; 422/195; 422/207; 422/211; 422/219; 422/242
[58] Field of Search ............... 422/188, 190, 191, 193, 422/194, 195, 207, 211, 219, 198, 242; 208/146; 55/387, 484

[56] References Cited

U.S. PATENT DOCUMENTS 2,391,315  12/1945  Hulsberg ........................... 422/188
3,847,574  11/1974  Fish .................................. 55/387

Primary Examiner—Joseph Scovronek
Attorney, Agent, or Firm—James R. Hoatson, Jr.; John F. Spears, Jr.; William H. Page, II

[57] ABSTRACT

A vapor-solids contacting apparatus useful as a catalytic reactor in the processing of hydrocarbonaceous reactants. A plurality of preferably rectangular cross-section elongated catalyst compartments are formed by box-like structures having two opposing parallel perforate planar sides and sealed ends. The perforate sides of adjacent catalyst compartments form two of the sides of reactant flow chambers having the same length. Alternating ends of the reactant flow chambers are sealed to direct the reactants flowing from one end of the vessel to the other through the catalyst compartments.

9 Claims, 4 Drawing Figures

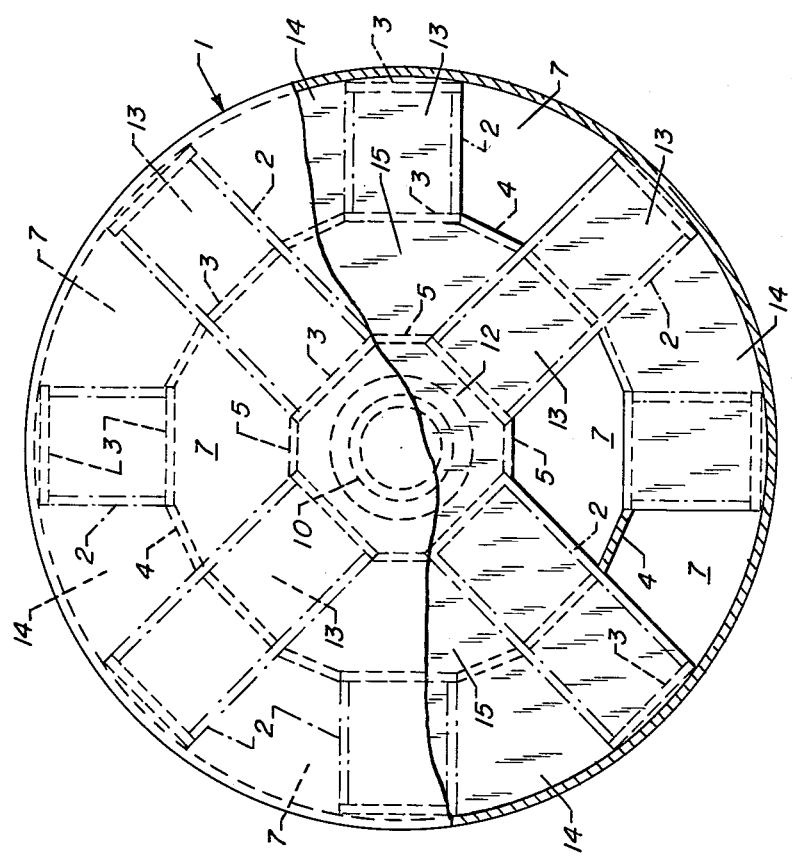
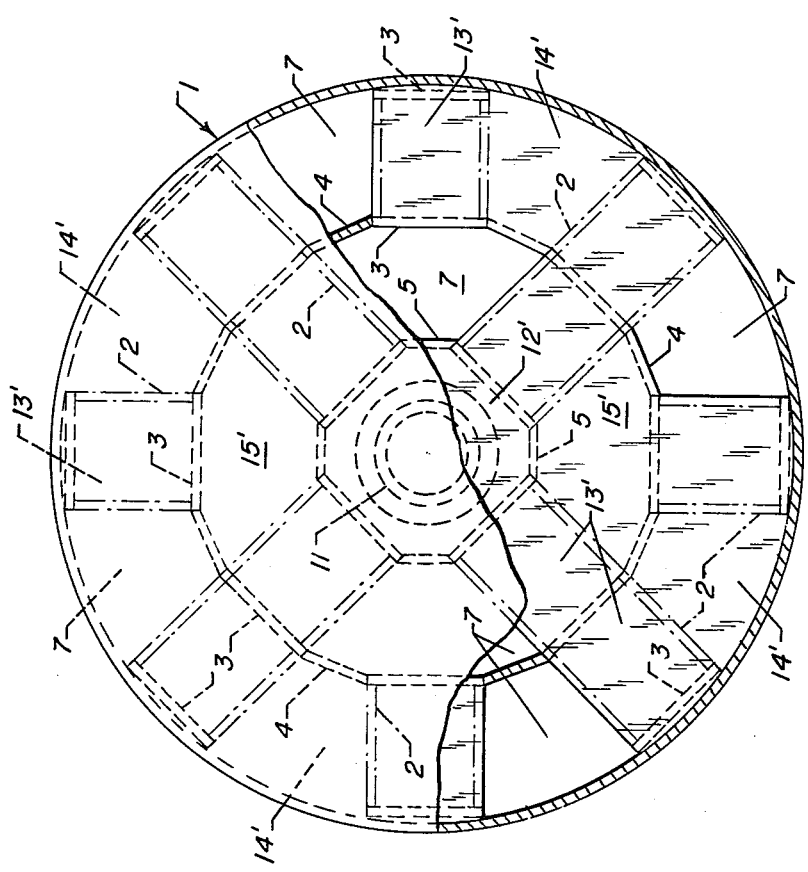

MULTI-BED CATALYTIC REACTOR

FIELD OF THE INVENTION

The invention relates to an apparatus useful as a catalytic reactor. The subject apparatus may be employed in petroleum refining, petrochemical and chemical processes, and flue gas treatment. The invention is specifically directed to a single-pass multi-bed reactor which may be used as a substitute for radial flow reactors operated at relatively high space velocities.

PRIOR ART

The extensive use of catalytic reactors has resulted in the evolution of a large number of reactor designs. One general type of reactor in widespread use is the radial flow reactor wherein reactants pass through an annular catalyst bed in a radial direction. This type of reactor is utilized when it is desired to pass a large reactant flow stream through a relatively thin layer of catalyst and is normally operated at a relatively high space velocity. The reactant stream will often be passed into the reaction vessel through a first end, distributed in an annular or cylindrical volume extending alongside the catalyst bed, passed through the two concentric cylindrical screens which hold the catalyst bed, collected in another void volume next to the outlet screen of the catalyst bed, and will then be directed out of the reaction vessel through a second end. The top as well as the bottom of the annular catalyst bed may be sealed. Various radial flow reactor designs are shown in U.S. Pat. Nos. 2,997,374; 3,620,685; 3,706,536 and 3,907,511.

U.S. Pat. Nos. 2,835,560 issued to M. M. Bason et al and 3,898,049 issued to J. W. Burroughs et al are pertinent for their showing of catalytic reactors having radial planar panels which form catalyst compartments. However, the planar panels are not the perforate reactant flow paths of the subject invention and the structure of these reference reactors differs significantly from the subject reactor. Another distinguishing feature is the objective of the references, which appears to be the provision of a single reactant flow path of great length.

SUMMARY OF THE INVENTION

The invention provides a catalytic reactor which may be used instead of a radial flow reactor and in which it is easier to provide a uniform catalyst bed depth than in a radial flow reactor. One broad embodiment of the invention may be characterized as a reactor which comprises an enclosed cylindrical vessel containing a plurality of elongated box-like catalyst compartments oriented with the central axis of the vessel, with each catalyst compartment having two sealed ends and sides formed by four planar panels of which one pair of opposing panels is perforate and parallel while the other pair of opposing panels is substantially imperforate; a plurality of reactant flow chambers located within the vessel and having substantially the same length as the catalyst compartments and being oriented with the central axis of the vessel, each reactant flow chamber having at least one side formed by the opposing perforate planar panel of an adjacent catalyst compartment; a bed of particulate catalyst within each catalyst compartment; means for sealing the first end of alternating reactant flow chambers; means for sealing the second end of each reactant flow chamber which is not sealed on its first end in a manner such that each catalyst compartment adjoins two reactant flow chambers which are sealed on opposite ends; inlet means for passing reactants into alternating reactant flow chambers; and outlet means for removing a reactant stream from the reactant flow chambers which are not in communication with the inlet means.

DESCRIPTION OF THE DRAWING

FIG. 3 is a cross-sectional view at a first end of the same reactor taken in a plane parallel to that of FIG. 1 and looking toward the second end of the reactor.

FIG. 4 is a cross-sectional view at the second end of the same reactor taken in a plane parallel to that of FIG. 1 but looking toward the first end of the reactor.

Referring now to FIG. 1, twelve rectangular beds of catalyst 6 are arranged in a circular pattern having two rows. Each catalyst bed is contained within a compartment having four sides, of which two are formed by a pair of opposing perforate panels 2 and two are formed by the substantially imperforate panels 3. All of the catalyst compartments are oriented parallel to the central vertical axis of the outer vessel 1. The edges of the outer imperforate panel 3 of the outer row of catalyst compartments abut the cylindrical inner surface of the outer vessel.

Figure 1:
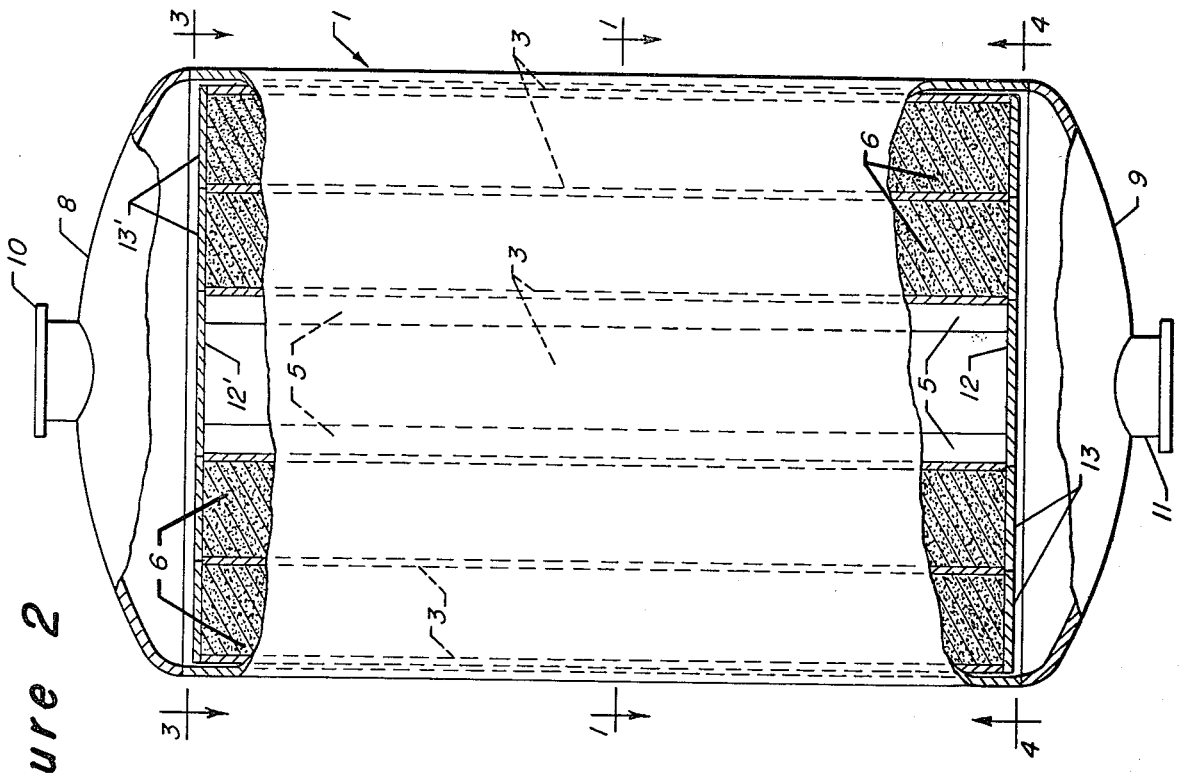
FIG. 1 is a cross-sectional view of a preferred embodiment of the subject reactor and presents the view seen when looking downward at a plane perpendicular to the central vertical axis of the reactor near the midpoint of the reactor.

Each catalyst compartment adjoins two reactant flow chambers 7, with the perforate panels of the catalyst compartments also forming the two perforate walls of the reactant flow chambers. The four-sided reactant flow chambers located in the outer row of catalyst compartments are enclosed on the remaining two sides by the imperforate walls 4 and the inner surface of the vessel. The imperforate sides of the reactant flow chambers located in the inner row of catalyst compartments are formed by a narrower imperforate wall 5, two of the imperforate walls 4 and the outer side of an imperforate panel 3 of a catalyst compartment. The remaining two sides of the inner row of reactant flow chambers are formed by the perforate panels of two different catalyst compartments.

The alternating walls 4 and imperforate panels 3 between radially adjoining catalyst compartments form a tubular-form imperforate wall surrounding the inner row of catalyst compartments. A second imperforate tubular-form wall is formed by the alternating narrower walls 5 and imperforate panels 3 on the radially inward side of the inner row of catalyst compartments. The opening of the reactant transfer means 11 is located under an imperforate plate 12 which seals the end of the volume within the second tubular-form wall.

Figure 2:
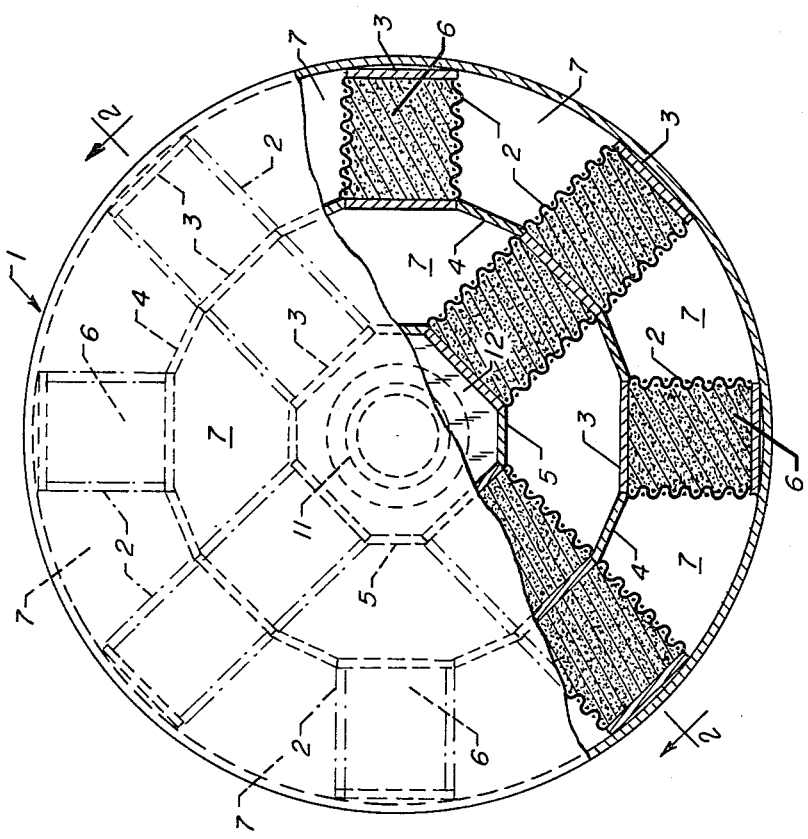
FIG. 2 is a cross-sectional view of the same reactor taken along a plane coinciding with the central vertical axis of the reactor.

FIG. 2 illustrates the elongated nature of the catalyst beds 6 located between the imperforate side panels 3 of the catalyst compartments. The upper first end of each catalyst compartment is sealed by an imperforate plate 13' having approximately the same shape as the end of the catalyst compartment. Similar imperforate plates 13 seal the lower second end of each catalyst compartment. An imperforate plate 12' seals the first end of the empty volume in the center of the reactor. Reactants may enter the reactor through the reactant transfer means 10 in the first end 8 of the vessel 1 or through the reactant transfer means 11 in the second end 9 of the vessel.

FIGS. 3 and 4 are presented to illustrate the manner in which alternate ends of the reactant flow chambers are sealed by the imperforate polygonal plates 14, 14', 15 and 15'. The edges of these plates are shown in these Figures, with the edges of the plates being directly over the perforate panels and imperforate walls and panels of the catalyst compartments and reactant flow chambers. Only those imperforate plates located at the end of the vessel at which the cross-section is taken are shaded. In FIG. 3, the position of the reactant transfer means 11 is seen, while in FIG. 4, the preferred location of the other reactant transfer means 10 is presented. These reactant transfer means are concentric about the central axis of the outer vessel 1 of the reactor. The manner in which the reactant flow chambers 7 are sealed at alternating ends may be seen from a comparison of FIGS. 3 and 4. A void volume at the center of the reactor is enclosed at its two ends by the imperforate plates 12 and 12'. The rectangular imperforate plates 13' seal the first end of each catalyst compartment, and similar imperforate plates 13 seal the second end of the same catalyst compartments.

DETAILED DESCRIPTION

In a great many petroleum, petrochemical and chemical processes, it is desirable to pass a fluid stream through one or more beds of catalyst or other solid particulate material with a low pressure drop through the catalyst. The fluids in these processes are normally vapor-phase streams comprising the reactants and possibly other vaporous materials such as diluents and catalyst promoters. The diluents may be such gases as nitrogen or steam. The vapor-solid contacting devices which are used in many of these processes will often be or resemble a radial flow reactor since this particular contactor design provides a low particle bed depth, measured along the fluid flow path, in a relatively small volume. Most of the discussion herein will therefore be presented in terms of the use of the subject apparatus as a reactor. However this is not intended to so limit the scope of the inventive concept, which may be applied to other types of contacting apparatus such as used, for instance, to purify a gas stream by passage through a bed of activated charcoal.

The reactants which are passed through a reactor are often hydrocarbonaceous in nature. That is, they are often organic chemical compounds which are predominantly composed of carbon and hydrogen but which may also contain oxygen, nitrogen, sulfur, etc. The reactants may be true hydrocarbons. For instance, when the hydrocarbon conversion process comprises the dehydrogenation of normal paraffins, the reactants may be one or more normal paraffins having a carbon number in the range from about 3 to about 18. The reactants may also comprise a stream of vaporized naphtha which is being subjected to a reforming operation for the purpose of increasing either the aromatic hydrocarbon content or the octane number of the reactant stream. Radial flow reactors may also be used in processes for the isomerization of paraffinic or alkylaromatic hydrocarbons and in processes for the dehydrogenation of alkylaromatic hydrocarbons. Those skilled in the art will recognize that the subject invention may be applied to these and other hydrocarbon conversion, petrochemical or chemical processes.

The flow rate of the reactant stream through any one portion of the particulate bed is inversely proportional to the resistance to flow through that portion of the particulate bed. That is, the reactants will prefer the path of least resistance. The flow rate of reactants will therefore be higher through those specific portions of a particulate bed which are not as thick and which present a lower resistance to fluid flow. If the variations in the depth of the bed are significant, the corresponding variation in the space velocity and contact time of the reactants with the catalyst may also vary significantly. This may have a definite adverse impact on the overall result of operating the process. For instance, an uneven distribution of the reactant flow may lead to a premature deactivation of those portions in the catalyst bed which are being contacted by a disproportionately high amount of the reactants. An uneven distribution of the reactant flow through the catalyst bed may also result in a temperature variation between various parts of the reactor. This in turn may lead to an increased rate of undesirable side reactions or make it difficult to control the overall conversion achieved within the reactor by varying the inlet or outlet temperatures.

It is desired that the variation in the catalyst bed depth over various locations in a reactor is less than 3% of the total bed depth. The fabrication of industrial scale radial flow reactors to this tolerance has proven difficult. This difficulty can result from the general requirement that the annular screens of a radial flow reactor are to be assembled within the cylindrical vessel which surrounds the internal reaction zone. This may require the final assembly of the reactor at less than optimum working conditions in a relatively confined space out of several pieces. The pieces of the catalyst screens must often be small enough to be passed into the reaction vessel through an opening such as a manway and this makes fabrication more difficult. For these and possibly other reasons, it has been found difficult to build two annular screens sufficiently concentric to be within the accepted tolerances on the depth of the particulate volume located between them. For example, the tolerance in a reactor having a bed depth of 225 mm is 6 mm, and the cylindrical catalyst screens have to be made to tolerances of 3 mm. This may be less than 0.2% of their total diameters.

It is an objective of the subject invention to provide a vapor solids contacting apparatus. It is another objective of the subject invention to provide a catalytic reactor. It is yet another objective of the subject invention to provide a catalytic reactor which may be used in the same situations as a radial flow reactor and which provides a large catalyst bed of a relatively low bed depth for the volume of the vessel in which it is contained. Another objective of the subject invention is to provide a catalytic reactor in which the reactor internals may be built in a modular form which provides a highly uniform catalyst bed depth in all portions of the reactor.

The apparatus of the subject invention includes an outer pressure vessel similar to those used for a great many purposes in hydrocarbon processing. The design of the outer vessel is therefore set to a large extent by the appropriate pressure vessel codes. This vessel is cylindrical about a central axis which runs through the center of the cylindrical empty volume enclosed by the vessel. The vessel is preferably sealed except for the necessary openings for fluid transfer means, temperature or pressure monitoring instruments, quench inlets, etc. The inlet and outlet fluid transfer means are preferably located at the opposing ends of the vessel as shown in the drawing. Either fluid transfer means may be used as the reactant inlet or reactant outlet. The central axis of the vessel is preferably vertical but may be horizontal.

A plurality of elongated box-like catalyst compartments are located within the internal volume of the vessel. Preferably, each of these catalyst compartments has substantially the same length, cross-section and overall general configuration. The catalyst compartments are enclosed on two of their four rather lengthy sides by a pair of opposing parallel perforate panels or screens. The perforate panels may be formed from any of the several types of perforated materials now used as catalyst retaining screens within reactors. The perforated panels may therefore be formed from perforated sheet metal, welded screens or reinforced wire mesh. The other two rather lengthy side walls of each catalyst compartment are formed by imperforate panels formed from thin gauge plate steel or another suitable material of construction.

The box-like catalyst compartments are sealed on both ends by imperforate plates which preferably have a shape generally equivalent to the cross-section of the catalyst compartment. However, if desired the appropriate openings may be provided in these plates to allow the transfer of catalyst into one end of each catalyst compartment and the withdrawal of catalyst from the other end of the catalyst compartment. The two perforate panels and the two imperforate panels of each catalyst compartment are parallel to each other such that the bed depth as measured between the two perforate panels is substantially equal at all points within the catalyst compartment. Preferably, the distance between the perforate panels is the same in each of the catalyst compartments.

The catalyst compartments are all preferably aligned with the central axis of the vessel. However, they may be arranged in a great many different patterns such as a checker board-type pattern within the vessel. Preferably, the catalyst compartments are arranged in a circular pattern similar to that shown in the drawing. This pattern or arrangement of the catalyst compartments can be more completely characterized in that the perforate panels are oriented such that a plane parallel to and half-way between the perforate panels may be extended to pass through the central axis of the outer vessel. That is, this plane will coincide with the central axis of the outer vessel along the axis of the vessel.

Each perforate panel of the catalyst compartment forms at least a portion of the side wall of a reactant flow chamber. Preferably, each reactant flow chamber adjoins the perforate panel of two or more catalyst compartments. The alternate ends of the reactant flow chambers are sealed in the proximity of the plates which seal the ends of the catalyst compartments. The open or unsealed end of each reactant flow chamber is in communication with one of the fluid transfer means provided for the passage of the reactant stream into and out of the vessel.

The reactant stream to be processed preferably enters through a single inlet at a first end of the reactor and is divided between a plurality of reactant flow chambers. Preferably, each of the resultant smaller reactant streams flows vertically into the empty void volume of the reactant flow chamber. The flow of each smaller stream is then evenly split between the two catalyst beds which are located in the two adjoining catalyst compartments. The reactants flow horizontally through these catalyst beds and emerge from the second perforate panel into a second plurality of reactant flow chambers which are sealed on the opposite end from the reactant flow chambers which are in communication with the inlet transfer means. The individual reactant streams flow out of the unsealed end of these reactant flow chambers and are combined to form an outlet stream which is removed through the outlet means at the second end of the vessel.

One embodiment of the invention may be characterized as an apparatus useful as a reactor for processing vaporous hydrocarbonaceous reactants which comprises an enclosed vessel which is cylindrical about a central axis and which has a first end and a second end and a cylindrical inner surface; a plurality of elongated box-like catalyst compartments located within the vessel and oriented with the central axis of the vessel, with each catalyst compartment having a sealed first end, a sealed second end and sides formed by four planar panels of which one pair of opposing panels is perforate and parallel and one pair of opposing panels is substantially imperforate; a plurality of reactant flow chambers located within the vessel and having substantially the same length as the catalyst compartments and being oriented with the central axis of the vessel, each reactant flow chamber having at least one side formed by the opposing perforate planar panel of an adjacent catalyst compartment; a bed of particulate catalyst within each catalyst compartment; means for sealing the first end of alternating reactant flow chambers; means for sealing the second end of each reactant flow chamber which is not sealed on the first end in a manner such that one of the perforate planar panels of each catalyst compartment adjoins a reactant flow chamber sealed at the first end and the second perforate panel of the same catalyst compartment adjoins a reactant flow chamber sealed at the second end; inlet means for passing reactants into alternating reactant flow chambers; and outlet means for removing reactants from reactant flow chambers which are not in communication with said inlet means whereby reactants may be passed into the vessel, distributed between alternating reactant flow chambers, passed through the two parallel perforate panels and the catalyst bed of a catalyst compartment and then withdrawn from the vessel.

The reactant flow chambers are located between adjacent catalyst or particle compartments. The shape of the cross-section of the flow chambers may vary as shown by FIG. 1. The flow chambers are actually formed by the spaces which remain after the catalyst compartments and necessary imperforate walls have been installed. Preferably, these chambers have an approximately equal cross-sectional area despite having differently shaped cross-sections. The rather small pressure drop through each of the chambers should therefore be equal and should not lead to unequal reactant flow. Appropriate baffling may be installed in the reactant flow chambers to cause uniformity of flow through the catalyst bed.

The depth of the catalyst bed, as measured between the two opposing perforate panels of each bed, may vary considerably from the relative proportions shown in the Drawing. The reactor may therefore be designed with a lesser or greater number of beds than shown. As the beds become thinner and as their number increases, the shape of the imperforate surface formed by the abutting imperforate panels of the catalyst compartments and the respective connecting imperforate walls becomes more circular. Both of these imperforate members are actually aligned with chords of a circle in the embodiment shown in the Drawing. For this reason, the radially inward row of catalyst compartments are referred to herein as being located between two imperforate concentric walls which are cylinder-like or tubular-form when viewed along their axis of concentricity.

The invention may therefore also be characterized as a catalytic reactor useful in processing vaporous hydrocarbonaceous reactants which comprises a vessel which is cylindrical about a central axis and which has a first end and a second end and a cylindrical inner surface; a first substantially imperforate tubular-form wall located within the outer vessel at a distance radially inward from the inner surface of the vessel and which is concentric about the central axis of the vessel; a second substantially imperforate tubular-form wall located within the vessel at a distance radially inward from the first tubular-form wall and which is concentric about the central axis of the vessel; a plurality of elongated catalyst compartments located in the volume between the first and the second tubular-form walls, with each catalyst compartment being oriented with the central axis of the vessel and having two opposing sides formed by a pair of parallel planar perforate panels which extend from the first to the second tubular-form walls, with each catalyst compartment having sealed first and second ends, and with the opposing perforate panels of adjacent catalyst compartments being spaced apart to provide reactant flow chambers located between the first and the second tubular-form walls having substantially the same length as the catalyst compartments, with each reactant flow chamber having a first and a second end; a bed of particulate catalyst within each of the catalyst compartments; seal plates closing the first end of alternating reactant flow chambers; seal plates closing the second end of each reactant flow chamber which does not have a seal plate on the first end; inlet means for passing reactants into alternating reactant flow chambers; and outlet means for removing reactants from reactant flow chambers which are not in communication with said inlet means.

Those skilled in the art will recognize that the apparatus as shown and described above may be modified in several ways while still remaining within the scope of the inventive concept. For instance, an additional catalyst compartment may be placed within the void volume at the center of the reactor between end plates 12 and 12'. As another possible variation, provision may be made to pass the reactant stream through two separate beds of catalyst in series much in the manner of a typical multi-bed plug flow reactor. In this variation, two or more sets of catalyst compartments may be provided, with each of the catalyst compartments being only about one-half or one-third the length of those shown in the Drawing. The appropriate quench and mixing means may be located between the vertically adjacent sets of catalyst compartments. Withdrawal and feed means may also be located at this point to facilitate interstage heating. Catalyst transfer means for passing fresh or newly regenerated catalyst into the top of the catalyst compartments and for removing used catalyst from the bottom of the reactor are another possible addition to the basic apparatus.

I claim as my invention:

1. A catalytic reactor useful in processing vaporous reactants which comprises:
   (a) a vessel which is cylindrical about a central axis and which has a first end and a second end and a cylindrical inner surface;
   (b) a first substantially imperforate tubular-form wall located within the outer vessel at a distance radially inward from the inner surface of the vessel and which is concentric about the central axis of the vessel;
   (c) a second substantially imperforate tubular-form wall located within the vessel at a distance radially inward from the first tubular-form wall and which is concentric about the central axis of the vessel;
   (d) a plurality of elongated catalyst compartments located in the volume located between the first and the second tubular-form walls, with each catalyst compartment being oriented with the central axis of the vessel and having two opposing sides formed by a pair of parallel planar perforate panels which extend from the first to the second tubular-form walls, with each catalyst compartment having sealed first and second ends, and with the opposing perforate panels of adjacent catalyst compartments being spaced apart to provide reactant flow chambers located between the first and the second tubular-form walls having substantially the same length as the catalyst compartments, with each reactant flow chamber having a first and a second end;
   (e) a bed of particulate catalyst within each of the catalyst compartments;
   (f) seal plates closing the first end of the alternating reactant flow chambers;
   (g) seal plates closing the second end of each reactant flow chamber which does not have a seal plate on the first end;
   (h) inlet means for passing reactants into alternating reactant flow chambers; and,
   (i) outlet means for removing reactants from reactant flow chambers which are not in communication with said inlet means.

2. The reactor of claim 1 further characterized in that the perforate planar panels are oriented such that a plane parallel to and halfway between the perforate panels coincides with the central axis of the vessel.

3. An apparatus useful as a reactor for processing vaporous reactants which comprises:
   (a) an enclosed vessel which is cylindrical about a central axis and which has a first end and a second end and a cylindrical inner surface;
   (b) a plurality of elongated box-like catalyst compartments located within the vessel and oriented with the central axis of the vessel, with each catalyst compartment having a sealed first end, a sealed second end and sides formed by four planar panels of which one pair of opposing panels is perforate and parallel and one pair of opposing panels is substantially imperforate;
   (c) a plurality of reactant flow chambers located within the vessel and having substantially the same length as the catalyst compartments and being oriented with the central axis of the vessel, each reactant flow chamber having at least one side formed by the opposing perforate planar panel of an adjacent catalyst compartment;
   (d) a bed of particulate catalyst within each catalyst compartment;

(e) means for sealing the first end of alternating reactant flow chambers;

(f) means for sealing the second end of each reactant flow chamber which is not sealed on the first end in a manner such that one of the perforate planar panels of each catalyst compartment adjoins a reactant flow chamber sealed at the first end and the second perforate panel of the same catalyst compartment adjoins a reactant flow chamber sealed at the second end;

(g) inlet means for passing reactants into alternating reactant flow chambers; and, (h) outlet means for removing reactants from reactant flow chambers which are not in communication with said inlet means whereby reactants may be passed into the vessel, distributed between alternating reactant flow chambers, passed through the two parallel perforate panels and the catalyst bed of a catalyst compartment and then withdrawn from the vessel.

4. The apparatus of claim 3 further characterized in that the catalyst compartments which form two sides of each reactant flow chamber are located at the same radial distance from the central axis of the vessel.

5. The apparatus of claim 4 further characterized in that the catalyst compartments are rectangular in cross-section.

6. The apparatus of claim 5 further characterized in that the catalyst compartments are arranged in a circular pattern about the central axis of the vessel, said pattern comprising two rows of catalyst compartments, with each row being at a different radial distance from the central axis of the vessel and with the outer row of catalyst compartments abutting the inner surface of the vessel.

7. The apparatus of claim 5 further characterized in that there is an equal number of catalyst compartments and reactant flow chambers.

8. The apparatus of claim 5 further characterized in that the catalyst compartments are oriented such that a plane parallel to and halfway between the perforate panels coincides with the central axis of the vessel.

9. The apparatus of claim 8 further characterized in that each reactant flow chamber has two sides formed by perforate panels of two different catalyst compartments.

* * * * *